S. RAINS.
Fence.
No. 16,996.
Patented April 7, 1857.
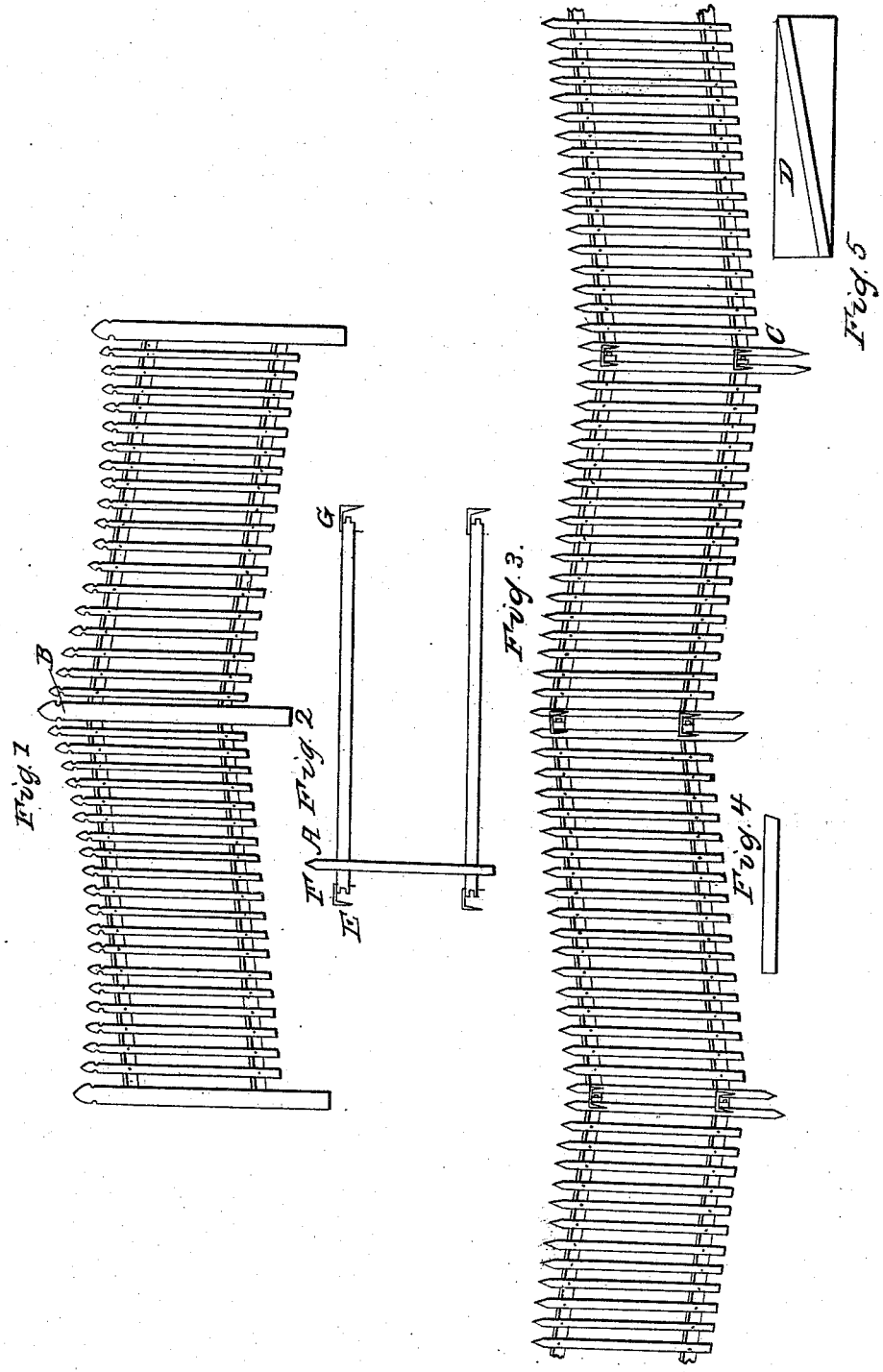

UNITED STATES PATENT OFFICE.

SAMUEL RAINS, OF LITWALTON, VIRGINIA.

FIELD-FENCE.

Specification of Letters Patent No. 16,996, dated April 7, 1857.

*To all whom it may concern:*

Be it known that I, SAML. RAINS, of the county of Lancaster and State of Virginia, have invented a new and Improved Mode of Making Plate-Fences, and do hereby declare that the following is a full and exact description thereof, reference being had to the accompanying drawings and to the letters of reference marked thereon.

The nature of my invention consists in making a paling fence without posts.

To enable others skilled in the art to make and use my invention, I will proceed to describe its construction and operation.

I have my rails sawed about two and a half by three inches, and from eight to ten feet long, and my pales sawed as poles usually are; I generally put a good many together and saw them off about four feet long, and for plain fence, I sharpen the upper ends with a hatchet as shown at A, Figure 2. I then instead of nailing the ends of the rails together confine them by means of a key or dog made of iron somewhat in the shape of a drawing knife with a sharp edge so as to cut in the wood and hold fast so there would be no working or slipping, see E Fig. 2; I also tongue and groove the ends of the rails as shown at F and G, Fig. 2, or what would answer equally as well would be to have a kind of ball and socket. Lay down two rails as in Fig. 2 and proceed to nail on pales leaving off one or two at each end of each panel. I then lay other rails on this panel precisely over the rails below, and then nail on pales above those below. I continue in this way (making all the panels by one) until I have as many panels as needed. I then proceed to set them up in a zigzag fashion as shown at Fig. 3. I have a board with the right bevel cut on one end, as shown at Fig. 4, which I lay on the rails, mark and saw off, then nail the ends of the rails together. The corner pales should be driven down in the ground a few inches (as at C Fig. 3) nailed on and sharpened with a saw.

If the land is level all the rails may be cut by one. The right bevel may be ascertained by drawing two parallel lines the distance apart you wish the fence to crook, which may be from one and a half to two and a half feet, and draw a line across as at D Fig. 1. For fancy fence I insert a piece of scantling, as shown at B, Fig. 1, with a neat head cut to it; the lower end of this piece of scantling should be set in the ground a few inches which will prevent it from blowing down or being easily knocked down.

What I claim as my invention and desire to secure by Letters Patent is—

The making of a fence without posts, when the panels are fastened together in the manner described.

SAML. RAINS.

Witnesses:
 WM. T. JESSE,
 T. C. MONTAGUE.